(12) United States Patent  
Black

(10) Patent No.: US 9,224,150 B2
(45) Date of Patent: Dec. 29, 2015

(54) IDENTIFYING HIGHLY VALUED RECOMMENDATIONS OF USERS IN A MEDIA RECOMMENDATION NETWORK

(75) Inventor: Gary W. Black, Cary, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 667 days.

(21) Appl. No.: 11/958,600

(22) Filed: Dec. 18, 2007

(65) Prior Publication Data

US 2009/0157795 A1 Jun. 18, 2009

(51) Int. Cl.
*G06Q 30/02* (2012.01)
*G06Q 50/00* (2012.01)
*H04L 12/58* (2006.01)
*G06Q 10/10* (2012.01)
*H04L 29/08* (2006.01)

(52) U.S. Cl.
CPC .............. *G06Q 30/02* (2013.01); *G06Q 10/10* (2013.01); *G06Q 50/01* (2013.01); *H04L 51/32* (2013.01); *H04L 67/306* (2013.01)

(58) Field of Classification Search
USPC ........................................................ 709/202
See application file for complete search history.

(56) References Cited

U.S. PATENT DOCUMENTS

| | | |
|---|---|---|
| 4,870,579 A | 9/1989 | Hey |
| 5,621,456 A | 4/1997 | Florin et al. |
| 5,771,778 A | 6/1998 | MacLean, IV |
| 5,956,027 A | 9/1999 | Krishnamurthy |
| 5,963,916 A | 10/1999 | Kaplan |
| 6,134,552 A | 10/2000 | Fritz et al. |
| 6,195,657 B1 | 2/2001 | Rucker et al. |
| 6,266,649 B1 | 7/2001 | Linden et al. |
| 6,314,420 B1 | 11/2001 | Lang et al. |
| 6,317,722 B1 | 11/2001 | Jacobi et al. |
| 6,353,823 B1 | 3/2002 | Kumar |
| 6,388,714 B1 | 5/2002 | Schein et al. |

(Continued)

FOREIGN PATENT DOCUMENTS

| | | |
|---|---|---|
| CN | 1208930 A | 2/1999 |
| EP | 0898278 A2 | 2/1999 |

(Continued)

OTHER PUBLICATIONS

"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.

(Continued)

*Primary Examiner* — Linglan Edwards

(57) ABSTRACT

A system and method are provided for discovering new friends using recommendation paths in a media recommendation network. In general, media items are recommended among users in a media recommendation network. Use of media items by the users is monitored. If the use of a media item by a user exceeds a threshold, a determination is made as to whether the media item was recommended to the user. If so, that recommendation is identified as a highly valued recommendation for that user. Thereafter, when the user desires to identify new friends from which to receive recommendations and to which to send recommendations, a recommendation path for the highly valued recommendation is identified. Users in the recommendation path that are not already friends of the user are identified as potential new friends for the user.

16 Claims, 13 Drawing Sheets

(56) References Cited

U.S. PATENT DOCUMENTS

| | | |
|---|---|---|
| 6,438,579 B1 | 8/2002 | Hosken |
| 6,498,955 B1 | 12/2002 | McCarthy et al. |
| 6,526,411 B1 | 2/2003 | Ward |
| 6,567,797 B1 | 5/2003 | Schuetze et al. |
| 6,587,127 B1 | 7/2003 | Leeke et al. |
| 6,587,850 B2 | 7/2003 | Zhai |
| 6,615,208 B1 | 9/2003 | Behrens et al. |
| 6,629,104 B1 | 9/2003 | Parulski et al. |
| 6,636,836 B1 | 10/2003 | Pyo |
| 6,654,786 B1 | 11/2003 | Fox et al. |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,757,517 B2 | 6/2004 | Chang |
| 6,757,691 B1 | 6/2004 | Welsh et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,912,528 B2 | 6/2005 | Homer |
| 6,941,275 B1 | 9/2005 | Swierczek |
| 6,941,324 B2 | 9/2005 | Plastina et al. |
| 6,947,922 B1 | 9/2005 | Glance |
| 6,976,228 B2 | 12/2005 | Bernhardson |
| 6,987,221 B2 | 1/2006 | Platt |
| 6,990,453 B2 | 1/2006 | Wang et al. |
| 7,013,301 B2 | 3/2006 | Holm et al. |
| 7,035,871 B2 | 4/2006 | Hunt et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,177,872 B2 | 2/2007 | Schwesig et al. |
| 7,222,187 B2 | 5/2007 | Yeager et al. |
| 7,283,992 B2 | 10/2007 | Liu et al. |
| 7,296,032 B1 | 11/2007 | Beddow |
| 7,340,481 B1 | 3/2008 | Baer et al. |
| 7,437,364 B1 | 10/2008 | Fredricksen et al. |
| 7,463,890 B2 | 12/2008 | Herz et al. |
| 7,496,623 B2 | 2/2009 | Szeto et al. |
| 7,509,291 B2 | 3/2009 | McBride et al. |
| 7,548,915 B2 | 6/2009 | Ramer et al. |
| 7,590,546 B2 | 9/2009 | Chuang |
| 7,594,246 B1 | 9/2009 | Billmaier et al. |
| 7,596,597 B2 * | 9/2009 | Liu et al. ............... 709/204 |
| 7,614,006 B2 | 11/2009 | Molander |
| 7,676,753 B2 | 3/2010 | Bedingfield |
| 7,680,959 B2 | 3/2010 | Svendsen |
| 7,720,871 B2 | 5/2010 | Rogers et al. |
| 7,805,129 B1 | 9/2010 | Issa et al. |
| 7,958,192 B2 * | 6/2011 | Harik et al. ............ 709/204 |
| 8,572,169 B2 * | 10/2013 | Partovi et al. .......... 709/204 |
| 2001/0013009 A1 | 8/2001 | Greening et al. |
| 2001/0021914 A1 | 9/2001 | Jacobi et al. |
| 2002/0052207 A1 | 5/2002 | Hunzinger |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0108112 A1 | 8/2002 | Wallace et al. |
| 2002/0116533 A1 | 8/2002 | Holliman et al. |
| 2002/0138836 A1 | 9/2002 | Zimmerman |
| 2002/0165793 A1 | 11/2002 | Brand et al. |
| 2002/0178057 A1 | 11/2002 | Bertram et al. |
| 2003/0001907 A1 | 1/2003 | Bergsten et al. |
| 2003/0005074 A1 | 1/2003 | Herz et al. |
| 2003/0014407 A1 | 1/2003 | Blatter et al. |
| 2003/0018799 A1 | 1/2003 | Eyal |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi et al. |
| 2003/0089218 A1 | 5/2003 | Gang et al. |
| 2003/0115167 A1 | 6/2003 | Sharif et al. |
| 2003/0135513 A1 | 7/2003 | Quinn et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 | 10/2003 | Hoch |
| 2003/0229537 A1 | 12/2003 | Dunning et al. |
| 2003/0237093 A1 | 12/2003 | Marsh |
| 2004/0003392 A1 | 1/2004 | Trajkovic et al. |
| 2004/0034441 A1 | 2/2004 | Eaton et al. |
| 2004/0073919 A1 | 4/2004 | Gutta |
| 2004/0088271 A1 | 5/2004 | Cleckler |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0267604 A1 | 12/2004 | Gross |
| 2005/0021420 A1 | 1/2005 | Michelitsch et al. |
| 2005/0021678 A1 | 1/2005 | Simyon et al. |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0091107 A1 | 4/2005 | Blum |
| 2005/0120053 A1 | 6/2005 | Watson |
| 2005/0125222 A1 | 6/2005 | Brown et al. |
| 2005/0131866 A1 | 6/2005 | Badros |
| 2005/0154608 A1 | 7/2005 | Paulson et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0251807 A1 | 11/2005 | Weel |
| 2005/0256756 A1 | 11/2005 | Lam et al. |
| 2005/0256866 A1 | 11/2005 | Lu et al. |
| 2005/0267944 A1 | 12/2005 | Little, IV |
| 2005/0278377 A1 | 12/2005 | Mirrashidi et al. |
| 2005/0278758 A1 | 12/2005 | Bodlaender |
| 2005/0286546 A1 | 12/2005 | Bassoli et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085383 A1 | 4/2006 | Mantle et al. |
| 2006/0100924 A1 | 5/2006 | Tevanian, Jr. |
| 2006/0126135 A1 | 6/2006 | Stevens et al. |
| 2006/0130120 A1 | 6/2006 | Brandyberry et al. |
| 2006/0143236 A1 | 6/2006 | Wu |
| 2006/0156242 A1 | 7/2006 | Bedingfield |
| 2006/0167991 A1 | 7/2006 | Heikes et al. |
| 2006/0173910 A1 | 8/2006 | McLaughlin |
| 2006/0174277 A1 | 8/2006 | Sezan et al. |

(56) References Cited

U.S. PATENT DOCUMENTS

| | | |
|---|---|---|
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0227673 A1 | 10/2006 | Yamashita et al. |
| 2006/0242201 A1 | 10/2006 | Cobb et al. |
| 2006/0247980 A1 | 11/2006 | Mirrashidi et al. |
| 2006/0248209 A1 | 11/2006 | Chin et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, II et al. |
| 2007/0078832 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1* | 5/2007 | Gerace et al. ............... 715/738 |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0233736 A1 | 10/2007 | Xiong et al. |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0033959 A1 | 2/2008 | Jones |
| 2008/0040313 A1 | 2/2008 | Schachter |
| 2008/0046948 A1 | 2/2008 | Verosub |
| 2008/0052371 A1* | 2/2008 | Partovi et al. ............... 709/217 |
| 2008/0052630 A1 | 2/2008 | Rosenbaum |
| 2008/0059576 A1* | 3/2008 | Liu et al. ............... 709/204 |
| 2008/0091771 A1 | 4/2008 | Allen et al. |
| 2008/0120501 A1 | 5/2008 | Jannink et al. |
| 2008/0133601 A1 | 6/2008 | Martin Cervera et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1* | 6/2008 | Fischer ............... 715/747 |
| 2008/0141136 A1 | 6/2008 | Ozzie et al. |
| 2008/0147482 A1* | 6/2008 | Messing et al. ............... 705/10 |
| 2008/0147711 A1 | 6/2008 | Spiegelman et al. |
| 2008/0189391 A1 | 8/2008 | Koberstein et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0208823 A1 | 8/2008 | Hicken |
| 2008/0228945 A1 | 9/2008 | Yoon et al. |
| 2008/0235632 A1 | 9/2008 | Holmes |
| 2008/0242221 A1 | 10/2008 | Shapiro et al. |
| 2008/0242280 A1 | 10/2008 | Shapiro et al. |
| 2008/0244681 A1 | 10/2008 | Gossweiler et al. |
| 2008/0270561 A1 | 10/2008 | Tang et al. |
| 2008/0276279 A1 | 11/2008 | Gossweiler et al. |
| 2008/0288588 A1 | 11/2008 | Andam et al. |
| 2008/0301118 A1 | 12/2008 | Chien et al. |
| 2008/0306826 A1 | 12/2008 | Kramer et al. |
| 2008/0319833 A1 | 12/2008 | Svendsen |
| 2009/0006368 A1 | 1/2009 | Mei et al. |
| 2009/0006374 A1 | 1/2009 | Kim et al. |
| 2009/0007198 A1 | 1/2009 | Lavender et al. |
| 2009/0042545 A1* | 2/2009 | Avital et al. ............... 455/414.1 |
| 2009/0055385 A1 | 2/2009 | Jeon et al. |
| 2009/0055467 A1 | 2/2009 | Petersen |
| 2009/0069911 A1 | 3/2009 | Stefik |
| 2009/0069912 A1 | 3/2009 | Stefik |
| 2009/0070350 A1 | 3/2009 | Wang |
| 2009/0077124 A1 | 3/2009 | Spivack et al. |
| 2009/0077220 A1 | 3/2009 | Svendsen et al. |
| 2009/0089288 A1 | 4/2009 | Petersen |
| 2009/0129671 A1 | 5/2009 | Hu et al. |
| 2009/0132527 A1 | 5/2009 | Sheshagiri et al. |
| 2009/0177301 A1 | 7/2009 | Hayes |
| 2010/0031366 A1 | 2/2010 | Knight et al. |

FOREIGN PATENT DOCUMENTS

| | | |
|---|---|---|
| EP | 1536352 A1 | 6/2005 |
| EP | 1835455 A1 | 9/2007 |
| GB | 2372850 A | 9/2002 |
| GB | 2397205 A | 7/2004 |
| JP | 2005-321668 | 11/2005 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006075032 A1 | 7/2006 |
| WO | 2006/126135 A2 | 11/2006 |
| WO | 2007092053 A1 | 8/2007 |

OTHER PUBLICATIONS

"Instant Messenger—AIM—Instant Message Your Online Buddies for Free—AIM," http://dashboard.aim.com/aim, copyright 2007 AOL LLC, printed Nov. 8, 2007, 6 pages.

"Apple—iPod classic," http://www.apple.com/ipodclassic/, printed Oct. 26, 2007, 1 page.

(56) References Cited

OTHER PUBLICATIONS

"betterPropaganda—Free MP3s and music videos.," http://www.betterpropaganda.com/, copyright 2004-2005 betterPropaganda, printed Feb. 7, 2007, 4 pages.
"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.
"Bluetooth.com—Learn," http://www.bluetooth.com/Bluetooth/Learn/, copyright 2007 Bluetooth SIG, Inc., printed Oct. 26, 2007, 1 page.
"ChoiceStream Technology Brief, Review of Personalization Technologies: Collaborative Filtering vs. ChoiceStream's Attributized Bayesian Choice Modeling," 13 pages.
"The Classic TV Database—Your Home for Classic TV!—www.classic-tv.com," http://www.classic-tv.com, copyright the Classic TV Database—www.classic-tv.com, printed Feb. 7, 2007, 3 pages.
"Digital Tech Life >> Download of the Week," http://www.digitaltechlife.com/category/download-of-the-week/, printed Feb. 16, 2007, 9 pages.
"MP3 music download website, eMusic," http://www.emusic.com/, copyright 2007 eMusic.com Inc., printed Feb. 7, 2007, 1 page.
"GenieLab::Music Recommendation System," http://web.archive.org/web/20060813000442/http://genielab.com/, copyright 2005 GenieLab, LLC, printed Oct. 26, 2007, 1 page.
"The Daily Barometer—GenieLab.com grants music lovers' wishes," http://media.barometer.orst.edu/home/index.cfm?event=displayArticlePrinterFriendly&uSt . . . , copyright 2007 The Daily Barometer, printed Feb. 16, 2007, 2 pages.
"Gracenote Playlist," Revised Dec. 29, 2005, 2 pages.
"Gracenote Playlist Plus," Revised Dec. 29, 2005, 2 pages.
"Gracenote," http://www.gracenote.com, printed Feb. 7, 2007, 1 page.
"IEEE 802.11—Wikipedia, the free encyclopedia," http://en.wikipedia.org/wiki/IEEE_802.11, printed Oct. 26, 2007, 5 pages.
"iLikeTM—Home," http://www.ilike.com/, copyright 2007 iLike, printed May 17, 2007, 2 pages.
"The Internet Movie Database (IMDb)," http://www.imdb.com/, copyright 1990-2007 Internet Movie Database Inc., printed Feb. 7, 2007, 3 pages.
"Apple—iPod + iTunes," http://www.apple.com/itunes/, copyright 2007 Paramount Pictures, printed Feb. 7, 2007, 2 pages.
"Last.fm the social music revolution," 1 page.
"Last.fm—Wikipedia, the free encyclopedia," http://en.wikipedia.org/wiki/Last.fm, printed Aug. 8, 2006, 7 pages.
"LimeWire—Wikipedia, the free encyclopedia," http://en.wikipedia.org/wiki/LimeWire, printed Aug. 8, 2006, 2 pages.
"Liveplasma music, movies, search engine and discovery engine," http://www.liveplasma.com, printed May 17, 2007, 1 page.
"Loomia—Personalized Recommendations for Media, Content and Retail Sites," http://www.loomia.com/, copyright 2006-2007 Loomia Inc., printed Feb. 7, 2007, 2 pages.
"Mercora—Music Search and Internet Radio Network," http://www.mercora.com/overview.asp, copyright 2004-2006 Mercora, Inc., printed Aug. 8, 2006, 1 page.
"Mercora—Music Search and Internet Radio Network," http://www.mercora.com/v6/_front/web.jsp, printed Feb. 7, 2007, 1 page.
"Outlook Home Page—Microsoft Office Online," http://office.microsoft.com/en-us/outlook/default.aspx, copyright 2007 Microsoft Corporation, printed Nov. 8, 2007, 1 page.
"Welcome to the Musicmatch Guide," http:/www.mmguide.musicmatch.com/, copyright 2001-2004 Musicmatch, Inc., printed Feb. 7, 2007, 1 page.
"Mongomusic.com—The Best Download mp3 Resources and Information. This website is for sale!," http://www.mongomusic.com/, printed May 17, 2007, 2 pages.
"Thunderbird—Reclaim your inbox," http://www.mozilla.com/en-US/thunderbird/, copyright 2005-2007 Mozilla, printed Nov. 8, 2007, 2 pages.
"Take a look at the Future of Mobile Music :: Music Guru," http://www.symbian-freak.com/news/006/02/music_guru.htm, copyright 2005 Symbian freak, printed Feb. 7, 2007, 3 pages.
"Music Recommendations 1.0—MacUpdate," http://www.macupdate.com/info.php/id/19575, printed Feb. 16, 2007, 1 page.
"MusicGremlin," http://www.musicgremlin.com/StaticContent.aspx?id=3, copyright 2005, 2006, 2007 MusicGremlin, Inc., printed Oct. 26, 2007, 1 page.
"MusicIP—The Music Search Engine," http://www.musicip.com/, copyright 2006-2007 MusicIP Corporation, printed Feb. 7, 2007, 1 page.
"Digital Music News," http://www.digitalmusicnews.com/results?title=musicstrands, copyright 2003-6 Digital Music News, printed Aug. 8, 2006, 5 pages.
"Musicstrands.com Because Music is Social," copyright 2006 MusicStrands, Inc., 2 pages.
"MyStrands for Windows 0.7.3 Beta," copyright 2002-2006 ShareApple.com networks, printed Jul. 16, 2007, 3 pages.
"MyStrands for Windows Change Log," http://www.mystrands.com/mystrands/windows/changelog.vm, printed Jul. 16, 2007, 6 pages.
"MyStrands Download," http://www.mystrands.com/overview.vm, printed Feb. 7, 2007, 3 pages.
"Napster—All the Music You Want," http://www.napster.com/using_napster/all_the_music_you_want.html, copyright 2003-2006 Napster, LLC, printed Feb. 7, 2007, 2 pages.
"Try Napster free for 7 Days—Play and download music without paying per song.," http://www.napster.com/choose/index.html, copyright 2003-2007 Napster, LLC, printed Feb. 7, 2007, 1 page.
"FAQ," http://blog.pandora.com/faq/, copyright 2005-2006 Pandora Media, Inc., printed Aug. 8, 2006, 20 pages.
"Pandora Internet Radio—Find New Music, Listen to Free Web Radio," http://www.pandora.com/, copyright 2005-2007 Pandora Media, Inc., printed Feb. 7, 2007, 1 page.
"Pandora Radio—Listen to Free Internet Radio, Find New Music," http://www.pandora.com/mgp, copyright 2005-2007 Pandora Media, Inc., printed Oct. 26, 2007, 1 page.
"RYM FAQ—Rate Your Music," http://rateyourmusic.com/faq/, copyright 2000-2007 rateyourmusic.com, printed Nov. 8, 2007, 14 pages.
"Rhapsody—Full-length music, videos and more—Free," http://www.rhapsody.com/welcome.html, copyright 2001-2007 Listen.com, printed Feb. 7, 2007, 1 page.
Badrul M. Sarwar et al., "Recommender Systems for Large-scale E-Commerce: Scalable Neighborhood Formation Using Clustering," 2002, 6 pages.
"Soundflavor," http://www.soundflavor.com/, copyright 2003-2007 Soundflavor, Inc., printed Feb. 7, 2007, 1 page.
"That canadian girl >> Blog Archive >> GenieLab," http://www.thatcanadiangirl.co.uk/blog/2005/02/22/genielab/, copyright 2007 Vero Pepperrell, printed Feb. 16, 2007, 3 pages.
"Trillian (software)—Wikipedia, the free encyclopedia," http://en.wikipedia.org/wiki/Trillian_(instant_messenger), printed Nov. 8, 2007, 11 pages.
"Ringo: Social Information Filtering for Music Recommendation," http://jolomo.net/ringo.html, printed Aug. 3, 2009, 1 page.
"Tour's Profile," http://mog.com/Tour, copyright 2006-2009 Mog Inc., printed Aug. 3, 2009, 11 pages.
"Babulous :: Keep it loud," http://www.babulous.com/home.jhtml, copyright 2009 Babulous, Inc., printed Mar. 26, 2009, 2 pages.
"UpTo11.net—Music Recommendations and Search," http://www.upto11.net/, copyright 2005-2006 Upto11.net, printed Feb. 7, 2007, 1 page.
"Webjay—Playlist Community," http://www.webjay.org/, copyright 2006 Yahoo! Inc., printed Feb. 7, 2007, 5 pages.
"Wired News:," http://www.wired.com/news/digiwoo/1,57634-0.html, copyright 2005 Lycos, Inc., printed Oct. 9, 2006, 3 pages.
"Not safe for work—Wikipedia, the free encyclopedia," http://en.wikipedia.org/wiki/Work_safe, printed Nov. 8, 2007, 2 pages.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

(56) References Cited

OTHER PUBLICATIONS

"Yahoo Music Jukebox—Wikipedia, the free encyclopedia," http://en.wikipedia.org/wiki/Yahoo_music_engine, printed Aug. 8, 2006, 1 page.
"LAUNCHcast Radio—Yahoo! Messenger," http://messenger.yahoo.com/launch.php, copyright 2007 Yahoo! Inc., printed Nov. 8, 2007, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"YouTube—Broadcast Yourself.," http://www.youtube.com/, copyright 2007 YouTube, LLC, printed Oct. 26, 2007, 2 pages.
"Zune.net—How-To-Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.
"Goombah—Preview," http://www.goombah.com/preview.html, printed Jan. 8, 2008, 5 pages.
Jeff Mascia et al., "Lifetrak: Music in Tune With Your Life," copyright 2006, 11 pages.
Jun Wang et al., "Music Recommender System for Wi-Fi Walkman," Delft University of Technology, 23 pages, Jan 2003.
Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story?track=tothtml, 5 pages.
Cai, Rui et al., "Scalable Music Recommendation by Search," Proc. ACM Multimedia, Augsburg, Germany, Sep. 2007, pp. 1065-1074.
Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.
Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.
Yahoo! Music downloaded archival page from www.archive.org for Jun. 20, 2005, copyright 2005 Yahoo! Inc., 14 pages.
"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.
"Identifying iPod models," http://support.apple.com/kb/HT1353, printed Feb. 24, 2010, 13 pages.
Mitchell, Bradley, "Cable Speed—How Fast is Cable Modem Internet?," http://www.compnetworking.about.com/od/interntaccessbestuses/f/cablespeed.htm, printed Feb. 24, 2010, 2 pages.
"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.
"Hulu—About," www.hulu.com/about/product_tour, copyright 2010 Hulu LLC, printed Jun. 15, 2010, 2 pages.
Nilson, Martin, "id3v2.4.0-frames—ID3.org," http://www.id3.org/id3v2.4.0-frames, Nov. 1, 2000, copyright 1998-2009, printed Jun. 15, 2010, 31 pages.
"Songbird," http://getsongbird.com/, copyright 2010 Songbird, printed Jun. 15, 2010, 2 pages.
"SongReference," http://songreference.com/, copyright 2008, SongReference.com, printed Jun. 15, 2010, 1 page.

* cited by examiner

USER TABLE — 28

| USER ID | NAME |
|---|---|
| 0001 | USER A |
| 0002 | USER B |
| 0003 | USER C |
| 0004 | USER D |
| 0005 | USER E |
| 0006 | USER F |
| 0007 | USER G |
| ⋮ | ⋮ |

*FIG. 3*

FRIENDS LIST TABLE — 30

| USER ID | FRIENDS LIST |
|---|---|
| 0001 | 0002<br>0003<br>0004 |
| 0002 | 0005<br>0006 |
| 0003 | XXXX<br>YYYY<br>ZZZZ |
| 0004 | XXXX<br>YYYY<br>ZZZZ |
| 0005 | 0007 |
| 0006 | XXXX<br>YYYY<br>ZZZZ |
| ⋮ | ⋮ |

*FIG. 4*

MEDIA ITEM TABLE ~32

| MEDIA ITEM ID | MEDIA ITEM |
|---|---|
| ⋮ | ⋮ |
| 1389 | 867-5309/JENNY |
| ⋮ | ⋮ |
| 1467 | HEY JUDE |
| ⋮ | ⋮ |
| 1741 | MY SHARONA |
| ⋮ | ⋮ |

*FIG. 5*

PLAY COUNT TABLE ~34

| USER ID | MEDIA ITEM ID | COUNT |
|---|---|---|
| 0001 | 1389 | 10 |
| 0001 | 1467 | 4 |
| 0002 | 1467 | 14 |
| 0003 | 1741 | 13 |
| 0004 | 1389 | 20 |
| 0005 | 1741 | 5 |
| ⋮ | ⋮ | ⋮ |

*FIG. 6*

RECOMMENDATION COUNT TABLE ~36

| USER ID | MEDIA ITEM ID | COUNT |
|---|---|---|
| 0001 | 1389 | 10 |
| 0001 | 1467 | 4 |
| 0002 | 1467 | 14 |
| 0003 | 1741 | 13 |
| 0004 | 1389 | 20 |
| 0005 | 1741 | 3 |
| ⋮ | ⋮ | ⋮ |

*FIG. 7*

RECOMMENDATION TABLE — 38

| RECOMMENDATION ID | MEDIA ITEM ID | ORIGINATING USER |
|---|---|---|
| ⋮ | ⋮ | ⋮ |
| 732 | 1389 | 0001 |
| 733 | 1467 | 1234 |
| 734 | 1741 | 0236 |
| 735 | 1389 | 0594 |
| ⋮ | ⋮ | ⋮ |

*FIG. 8*

RECOMMENDATION PATH TABLE — 40

| RECOMMENDATION ID | RECOMMENDER | RECIPIENT |
|---|---|---|
| ⋮ | ⋮ | ⋮ |
| 732 | 0001 | 0002 |
| 732 | 0001 | 0003 |
| 732 | 0001 | 0004 |
| ⋮ | ⋮ | ⋮ |
| 732 | 0002 | 0005 |
| 732 | 0002 | 0006 |
| ⋮ | ⋮ | ⋮ |
| 732 | 0005 | 0007 |
| ⋮ | ⋮ | ⋮ |

*FIG. 9*

HIGHLY VALUED RECOMMENDATION TABLE —42

| USER ID | RECOMMENDATION ID |
|---|---|
| 0001 | 732 |
| 0002 | 733 |
| 0003 | 734 |
| 0004 | 732 |
| ⋮ | ⋮ |

FIG. 10

IDENTIFYING HIGHLY VALUED RECOMMENDATIONS OF USERS IN A MEDIA RECOMMENDATION NETWORK

FIELD OF THE INVENTION

The present invention relates to identifying highly valued recommendations of a user in a media recommendation network.

BACKGROUND OF THE INVENTION

Social networks are a key component of many systems ranging from instant messaging systems to media recommendation systems. One example of a social network based recommendation system is described in commonly owned and assigned U.S. patent application Ser. No. 11/484,130, entitled P2P NETWORK FOR PROVIDING REAL TIME MEDIA RECOMMENDATIONS, which was filed on Jul. 11, 2006 and is hereby incorporated herein by reference in its entirety. In general, social network based recommendation systems, such as that described in U.S. patent application Ser. No. 11/484,130, enable users to send media recommendations to and receive media recommendations from other users in a social network. However, one issue with social network based systems, including social network based recommendation systems, is the discovery of new friends. Traditionally, a user has been required to have prior knowledge of friends that the user desires to add to his or her social network or is allowed to select new friends from a global list of users. As such, there is a need for a system and method of quickly and easily discovering new friends for the user's social network.

SUMMARY OF THE INVENTION

The present invention relates to identifying highly valued recommendations of a user in a media recommendation network. Recommendation paths for the highly valued recommendations may then be used to discover new friends for the user. In general, media items are recommended among users in a media recommendation network. For example, a particular media item may be recommended from an originating user to one or more friends of the originating user, from the friends of the originating user to one or more of their friends, and so on. In order to enable discovery of new friends, use of media items by the users is monitored. If the use of a media item by a user exceeds a threshold, a determination is made as to whether the media item was recommended to the user. If so, that recommendation is identified as a highly valued recommendation for that user. Thereafter, when the user desires to identify new friends from which to receive recommendations and to which to send recommendations, a recommendation path for the highly valued recommendation is identified. Users in the recommendation path that are not already friends of the user are identified as potential new friends for the user. The user may then select one or more of the potential new friends as new friends for the user. Alternatively, one or more of the potential new friends may be programmatically, or automatically, selected as new friends for the user.

In one embodiment, in order to monitor use, a play count indicative of a number of times the user has played the media item is maintained. When the user has played the media item more than a play count threshold number of times, the recommendation of the media item to the user is identified as a highly valued recommendation for the user. In another embodiment, in order to monitor the user, a recommendation count indicative of a number of times that the user has recommended the media item to another user is maintained. When the user has recommended the media item more than a recommendation count threshold number of times, the recommendation of the media item to the user is identified as a highly valued recommendation for the user. In yet another embodiment, both the play count and the recommendation count may be monitored. When the user plays or recommends the media item more than a threshold number of times, the recommendation of the media item to the user is identified as a highly valued recommendation for the user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 3 illustrates an exemplary embodiment of the user table of FIG. 1;

FIG. 4 illustrates an exemplary embodiment of the friends list table of FIG. 1;

FIG. 5 illustrates an exemplary embodiment of the media item table of FIG. 1;

FIG. 6 illustrates an exemplary embodiment of the play count table of FIG. 1;

FIG. 7 illustrates an exemplary embodiment of the recommendation count table of FIG. 1;

FIG. 8 illustrates an exemplary embodiment of the recommendation table of FIG. 1;

FIG. 9 illustrates an exemplary embodiment of the recommendation path table of FIG. 1;

FIG. 10 illustrates an exemplary embodiment of the highly valued recommendation table of FIG. 1;

Figure 1:
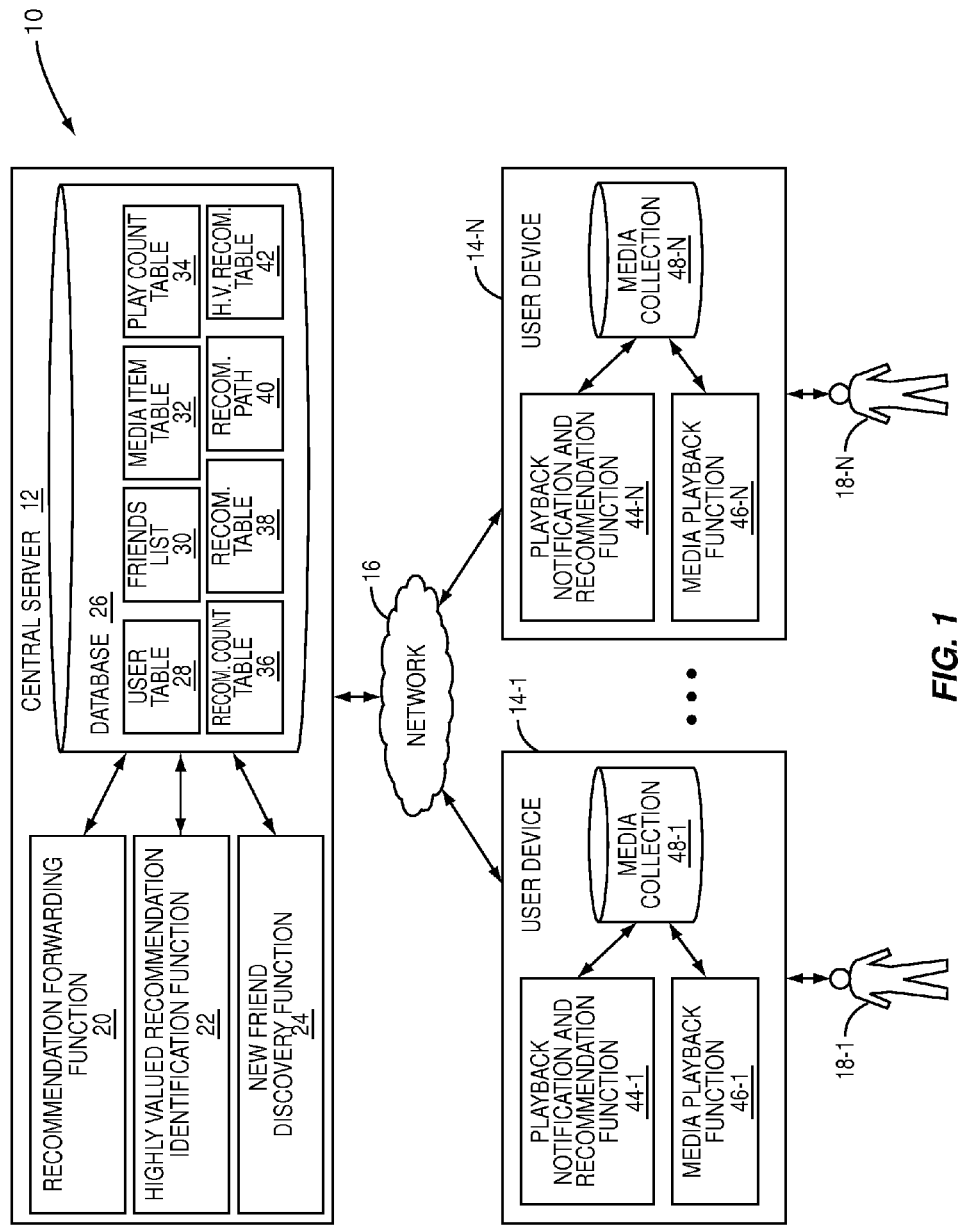
FIG. 1 illustrates a system enabling new friend discovery using recommendation paths in a media recommendation network according to one embodiment of the present invention.
Figure 12A:
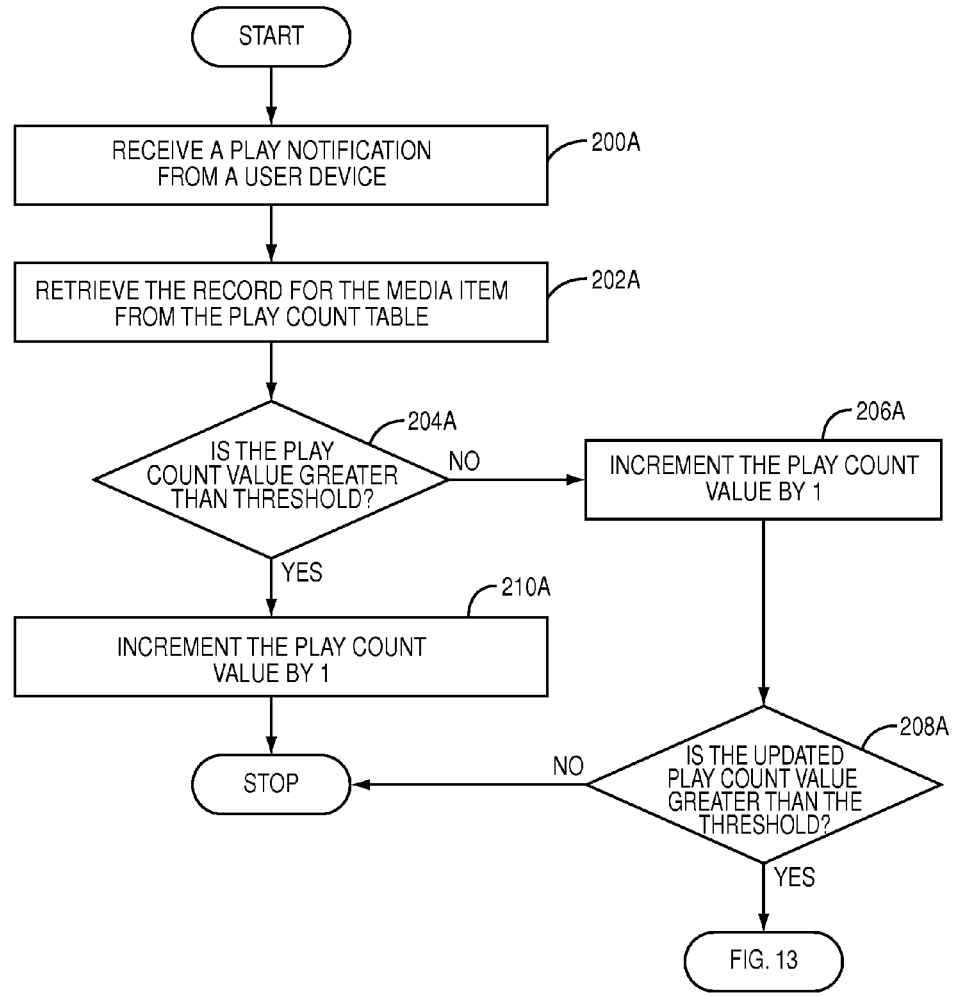
Figure 12B:
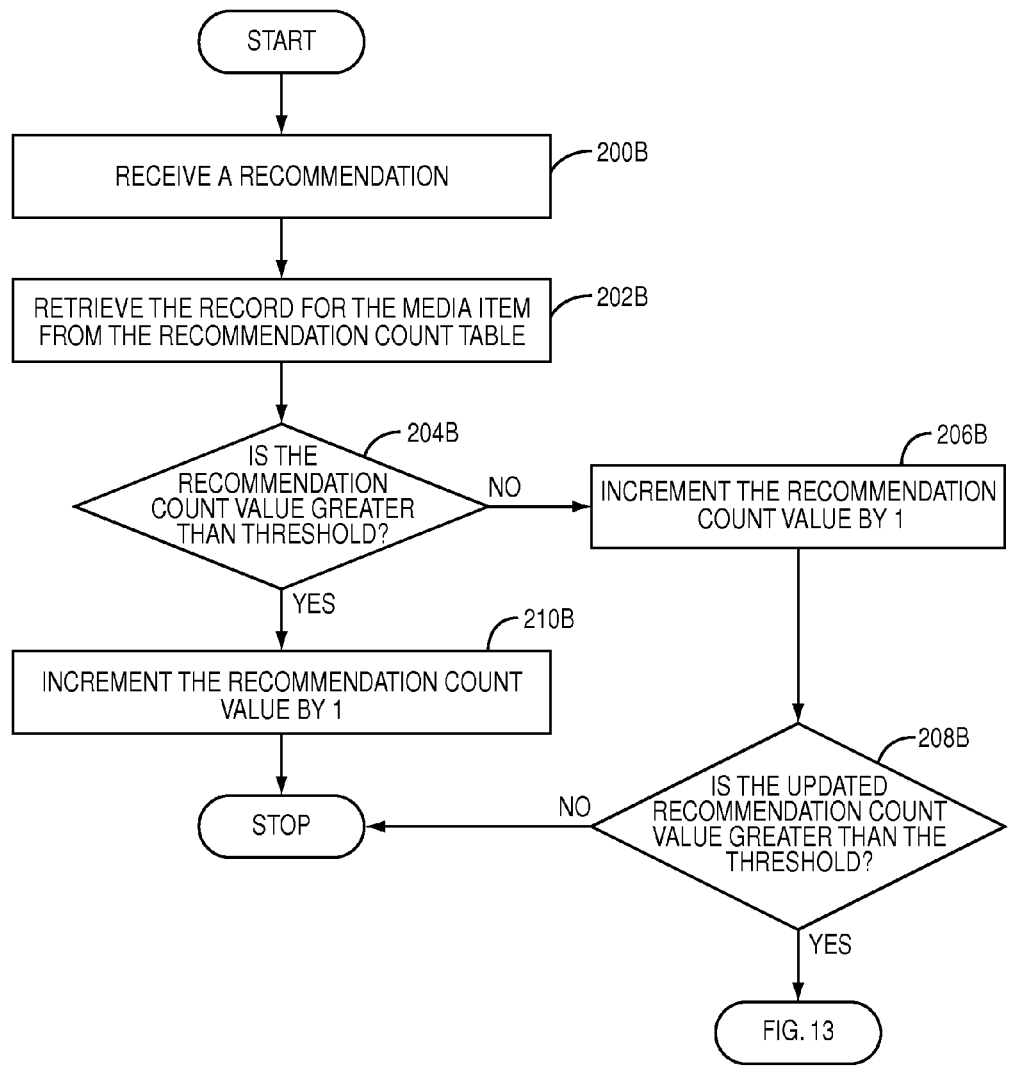
Figure 13:
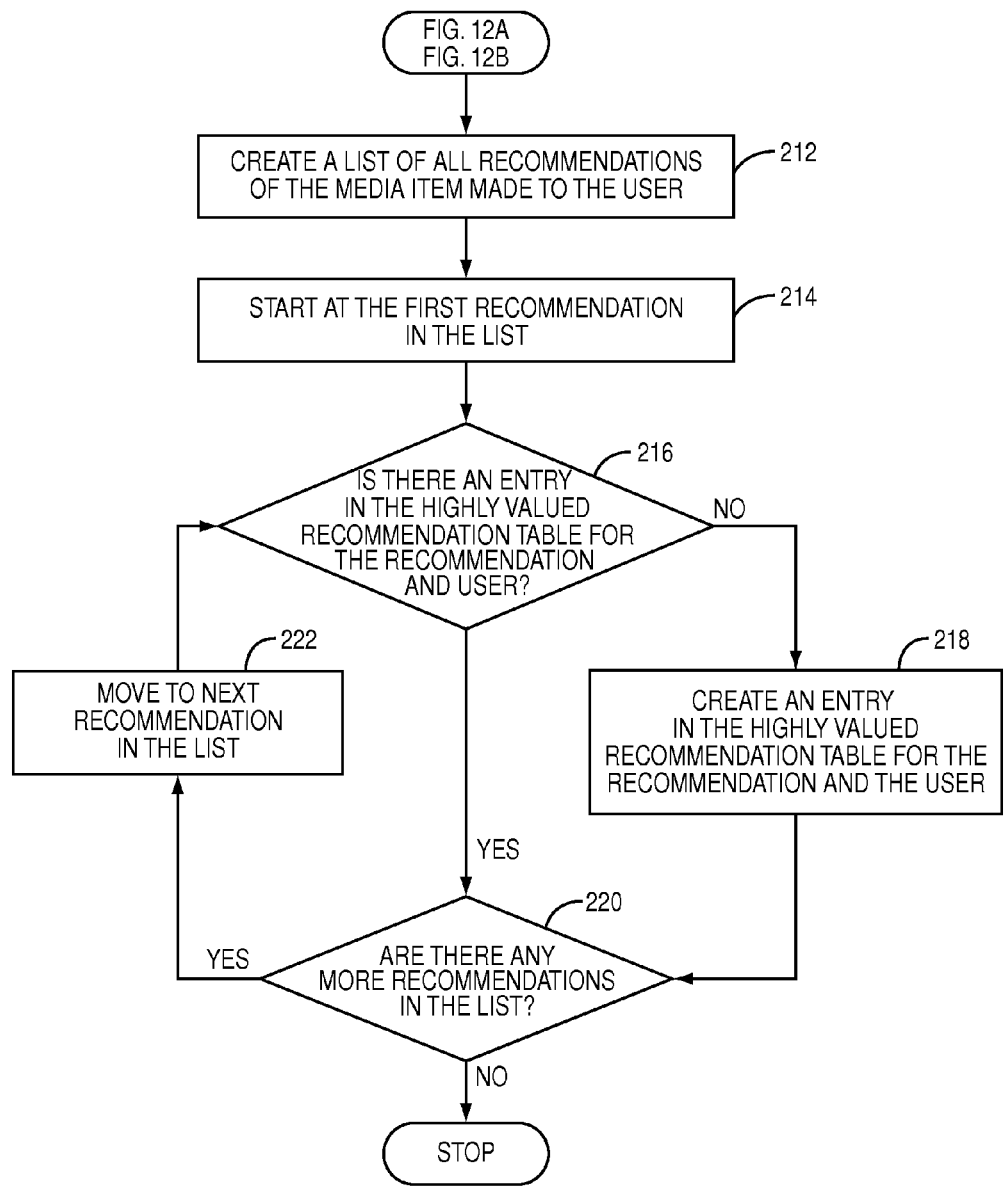
Figure 14A:
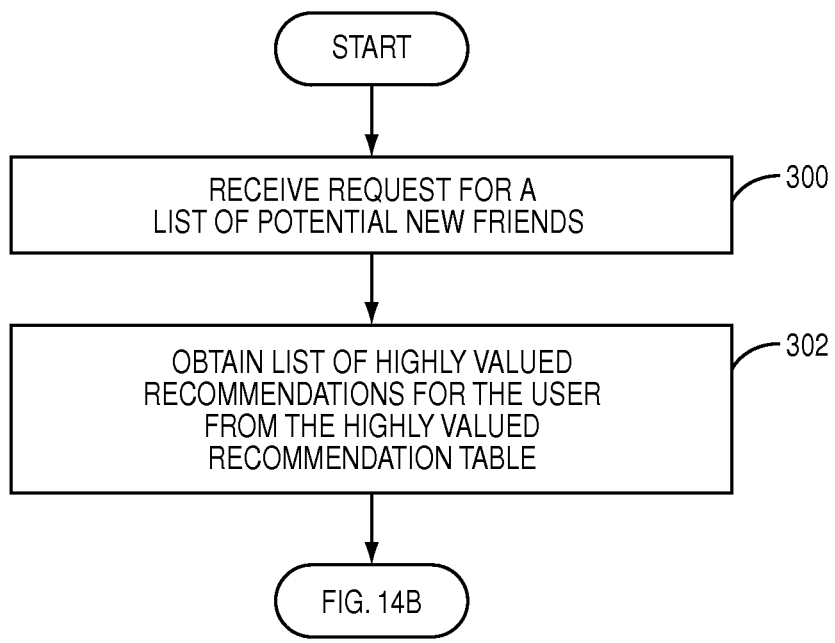
Figure 14B:
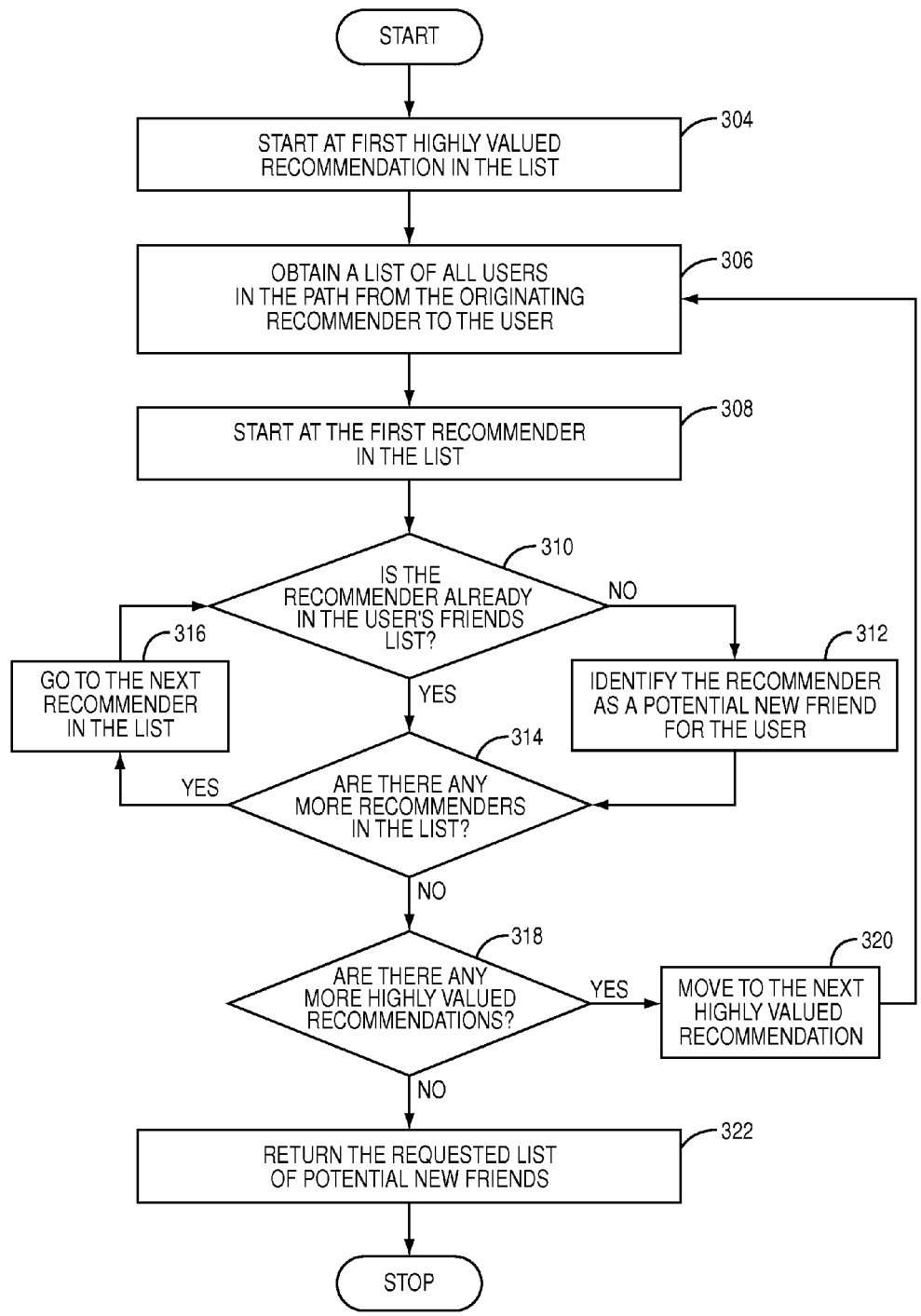
Figure 16:
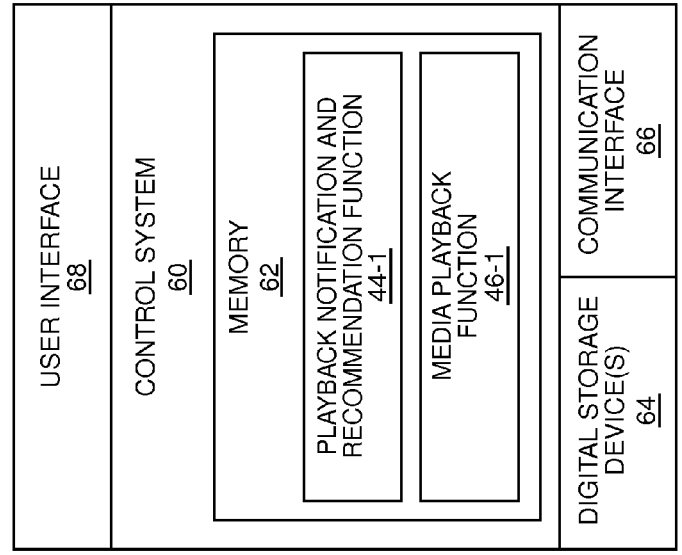
Figure 15:
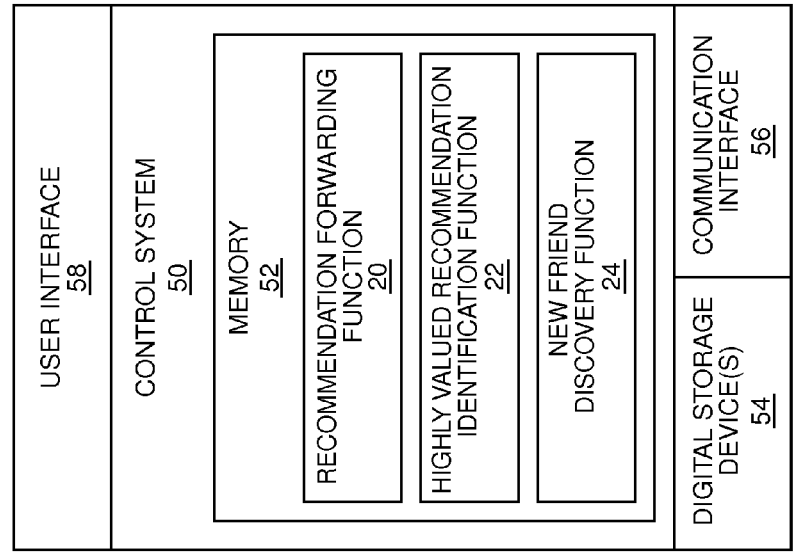

FIGS. 12A, 12B, and 13 provide flow charts illustrating the operation of the highly valued recommendation identification function of FIG. 1 according to one embodiment of the present invention;

FIGS. 14A and 14B are flow charts illustrating the operation of the new friend discovery function of FIG. 1 according to one embodiment of the present invention;

FIG. 15 is a block diagram of the central server of FIG. 1 according to one embodiment of the present invention; and FIG. 16 is a block diagram of one of the user devices of FIG. 1 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates a system 10 enabling new friend discovery using recommendation paths in a media recommendation network according to one embodiment of the present invention. In general, the system 10 includes a central server 12 and a number of user devices 14-1 through 14-N connected via a network 16. The network 16 may be any type of Wide Area Network (WAN) or Local Area Network (LAN), or any combination thereof. In addition, the network 16 may include wired components, wireless components, or both wired and wireless components. Users 18-1 through 18-N are associated with the user devices 14-1 through 14-N. Note that while a single central server 12 is illustrated in FIG. 1, the present invention is not limited thereto. The functionality of the central server 12 may alternatively be distributed among multiple servers.

The central server 12 includes a recommendation forwarding function 20, a highly valued recommendation identification function 22, a new friend discovery function 24, and a database 26. The database 26 may alternatively be a remote database 26 accessed by the central server 12 via a remote connection such as, but not limited to, the network 16. In general, each of the recommendation forwarding function 20, the highly valued recommendation identification function 22, and the new friend discovery function 24 is preferably implemented in software. However, the present invention is not limited thereto. Further, while the recommendation forwarding function 20, the highly valued recommendation identification function 22, and the new friend discovery function 24 are illustrated as separate functional blocks, the present invention is not limited thereto. The functionality provided by the recommendation forwarding function 20, the highly valued recommendation identification function 22, and the new friend discovery function 24 may be combined or further divided in any desired manner.

The operation of each of the recommendation forwarding function 20, the highly valued recommendation identification function 22, and the new friend discovery function 24 is described below in detail. However, in general, the recommendation forwarding function 20 operates to receive recommendations from the user devices 14-1 through 14-N and forward those recommendations to others of the user devices 14-1 through 14-N associated with the desired recipients. For example, the recommendation forwarding function 20 may receive a recommendation for a media item from the user device 14-1. The recommendation preferably includes a media item identifier (ID) for the recommended media item rather than the media item itself. However, the recommendation may alternatively include the media item itself. The recommendation forwarding function 20 then forwards the recommendation to one or more of the user devices 14-2 through 14-N associated with friends of the user 18-1. In an alternative embodiment, the user 18-1 may select one or more friends from his friends list to which the recommendation is to be provided. The selected friends may be identified in the recommendation or provided to the recommendation forwarding function 20 in a separate message from the user device 14-1.

The highly valued recommendation identification function 22 generally operates to identify recommendations that are highly valued to the users 18-1 through 18-N. More specifically, using the user device 14-1 as an example, the highly valued recommendation identification function 22 monitors use of media items by the user device 14-1. In order to monitor the use of the media item, the highly valued recommendation identification function 22 may monitor the number of times that media items are played by the user 18-1 at the user device 14-1, the number of times that each particular media item is recommended by the user 18-1 of the user device 14-1, or both. When a media item is played greater than a play count threshold number of times or when a media item is recommended greater than a recommendation count threshold number of times, the highly valued recommendation identification function 22 determines whether the media item was previously recommended to the user 18-1 of the user device 14-1. If so, the recommendation of the media item is identified as a highly valued recommendation of the user 18-1.

The new friend discovery function 24 generally operates to identify new potential friends for the users 18-1 through 18-N using recommendation paths for highly valued recommendations of the users 18-1 through 18-N. Again, using the user 18-1 as an example, the user 18-1 may initiate a process at the user device 14-1 for requesting a list of potential new friends for the user 18-1. The user device 14-1 then sends a request for a list of new potential friends to the central server 12. In response, the new friend discovery function 24 identifies a recommendation path for each of a number of highly valued recommendations of the user 18-1 identified by the highly valued recommendation identification function 22. A recommendation path includes an originating recommender and zero or more intermediate recommenders through which the recommendation was propagated to the user 18-1. Any of the other users 18-2 through 18-N that are in the recommendation path and are not already friends of the user 18-1 are identified as potential new friends for the user 18-1. A list of the potential new friends is then returned to the user device 14-1, where the user 18-1 may select one or more of the potential new friends to add as new friends. Alternatively, either the central server 12 or the user device 14-1 may operate to programmatically, or automatically, select new friends for the user 18-1 from the list of potential new friends using a technique such as, for example, user profile matching. As used herein, a "friend" of the user 18-1 is another user from the users 18-2 through 18-N identified as such by, for example, a friends list associated with the user 18-1. The friends of the user 18-1 form, or are part of, a social network of the user 18-1 such as, for example, the media recommendation network of the user 18-1.

The database 26 generally stores information enabling the operation of the recommendation forwarding function 20, the highly valued recommendation identification function 22, and the new friend discovery function 24. In this embodiment, the database 26 stores a user table 28, a friends list table 30, a media item table 32, a play count table 34, a recommendation count table 36, a recommendation table 38, a recommendation path table 40, and a highly valued recommendation table 42. Note that while tables are discussed herein as an example, the corresponding information may be stored in any type or number of data structures. The contents of the user table 28, the friends list table 30, the media item table 32, the play count table 34, the recommendation count table 36, the recommendation table 38, the recommendation path table 40, and the highly valued recommendation table 42 are discussed below in detail.

The user devices 14-1 through 14-N may be any type of user device capable of connecting to the network 16 and having media playback capabilities. For example, each of the user devices 14-1 through 14-N may be a personal computer, a portable media player device such as an Apple iPod® or Microsoft Zune® media player having wireless capabilities, a set-top box, a game console, or the like. The user devices 14-1 through 14-N include playback notification and recommendation functions 44-1 through 44-N, media playback functions 46-1 through 46-N, and user media collections 48-1 through 48-N (hereinafter media collections 48-1 through 48-N), respectively. Preferably, the playback notification and recommendation functions 44-1 through 44-N and the media playback functions 46-1 through 46-N are implemented in software. However, the present invention is not limited thereto. The playback notification and recommendation functions 44-1 through 44-N and the media playback functions 46-1 through 46-N may alternatively be implemented in hardware or a combination of hardware and software. Further, while the playback notification and recommendation functions 44-1 through 44-N are illustrated as being separate from the media playback functions 46-1 through 46-N, the present invention is not limited thereto. The playback notification and recommendation functions 44-1 through 44-N may alternatively be implemented as part of the media playback functions 46-1 through 46-N.

Using the user device 14-1 as an example, the playback notification and recommendation function 44-1 operates to provide play notifications to the central server 12 in response to playback of media items by the media playback function 46-1. The play notifications include the media item ID of the media item played and a user ID of the user 18-1. The play notifications are used by the highly valued recommendation identification function 22 to maintain the play count table 34. In addition, in one embodiment, the play notifications operate as recommendations to be provided to the friends of the user 18-1. As such, when such recommendations are desired, the play notifications may be referred to as recommendations and may also be used by the highly valued recommendation identification function 22 to maintain the recommendation count table 36. Thus, in a system where there are only play notifications, the play count and recommendation count values would be the same.

The playback notification and recommendation function 44-1 may also operate to generate recommendations as instructed by the user 18-1. More specifically, whereas playback notifications may be sent to the central server 12 as recommendations in response to playback of the media items at the user device 14-1, the playback notification and recommendation function 44-1 may also enable the user 18-1 to make recommendations at any time. For example, the user 18-1 may select a media item to be recommended and initiate a recommendation to all of his friends or to at least one select friend. In response, the playback notification and recommendation function 44-1 sends a corresponding recommendation to the central server 12. The recommendation includes a user ID of the user 18-1 and a media item ID of the recommended media item. In addition, the recommendation may include the user IDs of the desired recipients for the recommendation. The recommendation forwarding function 20 then forwards the recommendation to the desired recipients.

The playback notification and recommendation function 44-1 may also operate to process recommendations received from the friends of the user 18-1. For example, the playback notification and recommendation function 44-1 may score the recommended media items as a function of user preferences of the user 18-1. Recommended media items scored above a threshold value that are not already in the media collection 48-1 of the user 18-1 may be obtained from a media distribution service such as or similar to, for example, Apple's iTunes® store. The media items in the media collection 48-1 of the user 18-1 may then be prioritized as a function of their scores. For more information regarding an exemplary scoring process, the interested reader is directed to U.S. patent application Ser. No. 11/484,130, which has been incorporated herein by reference in its entirety.

Figure 2:
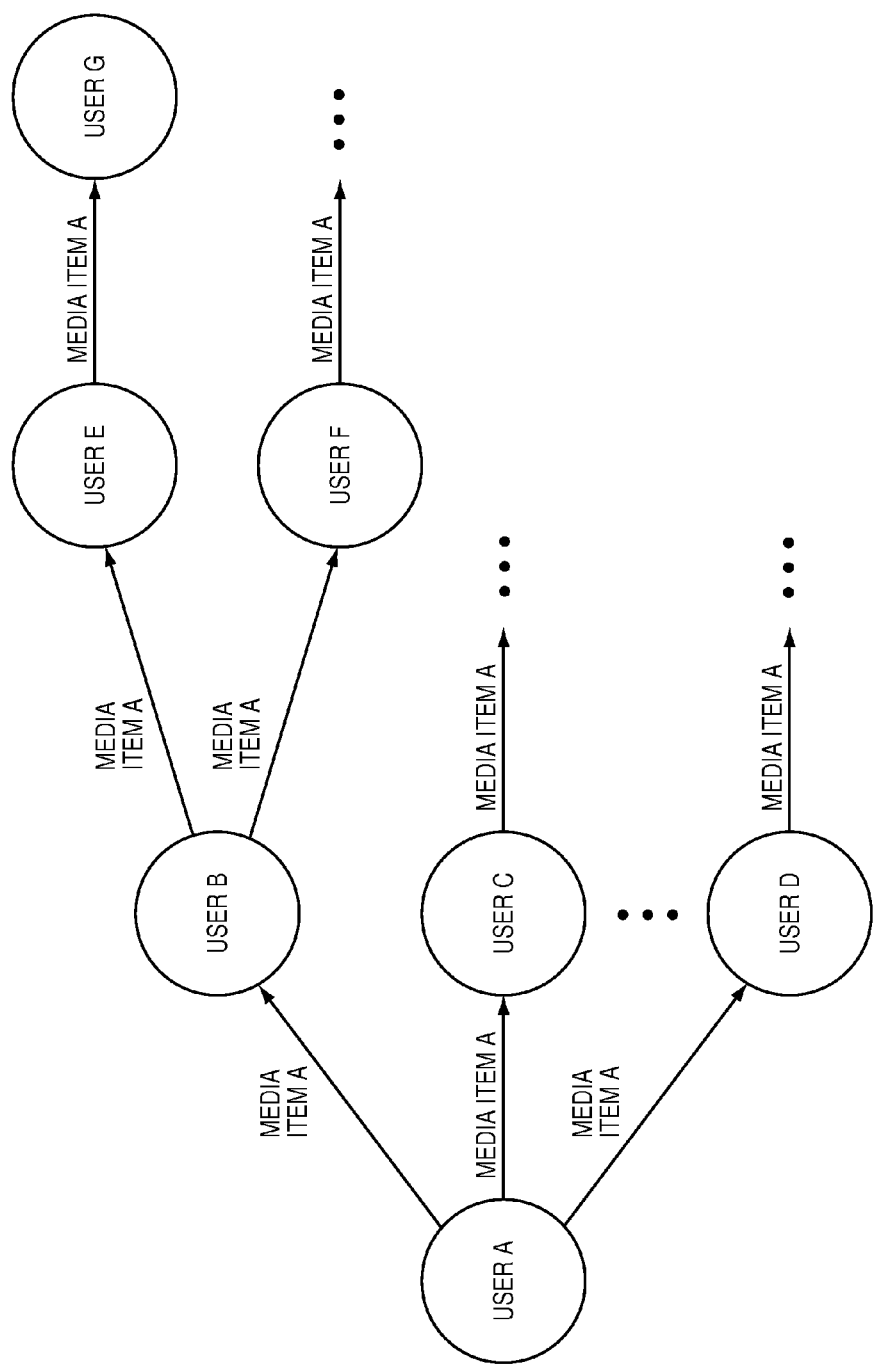
FIG. 2 illustrates a recommendation path in a media recommendation network according to one embodiment of the present invention.

FIG. 2 is a diagram illustrating a recommendation path for a recommendation of a media item, media item A, according to one embodiment of the present invention. As illustrated, user A first recommends media item A to his friends user B, user C, . . . , and user D. User A is referred to herein as an originating recommender. User B then recommends media item A to two of his friends, user E and user F. User E then recommends media item A to his friend, user G. Thus, the recommendation path for media item A to user G is: user A, user B, and user E. User A is referred to as an originating recommender, users B and E are referred to as intermediate recommenders where user E is more specifically referred to as a direct recommender, and user G is referred to as a recipient.

FIG. 3 illustrates an exemplary embodiment of the user table 28. As shown, the user table 28 includes an entry, or record, for each of the users 18-1 through 18-N. Each entry includes a user ID and name of the corresponding user of the users 18-1 through 18-N. FIG. 4 illustrates an exemplary embodiment of the friends list table 30. In this example, the friends list table 30 includes an entry for each of the users 18-1 through 18-N. Each entry includes the user ID of the corresponding user and a list of user IDs of the friends of the corresponding user. FIG. 5 illustrates an exemplary embodiment of the media item table 32. As shown, the media item table 32 includes an entry for each of a number of media items known to the central server 12. Each entry includes a media item ID and a title of the corresponding media item. The media item table 32 may store additional information describing each media item. For example, for a song, the media item table 32 may store a genre of the song, an artist of the song, a title of the song, a date of release of the song, and the like.

FIG. 6 illustrates an exemplary embodiment of the play count table 34. As shown, each entry of the play count table 34 includes a user ID, a media item ID, and a play count value. Thus, in this example, the user having the user ID 0001 has played the media item having the media item ID 1389 ten (10) times. Further, as shown the user table 28 and the media item table 32, the user having the user ID 0001 is the user A, the media item having the media item ID of 1389 is "867-5309/Jenny." In similar fashion, FIG. 7 illustrates an exemplary embodiment of the recommendation count table 36. As shown, each entry in the recommendation count table 36 includes a user ID, a media item ID, and a recommendation count value. Thus, in this example, the user having the user ID 0001 has recommended the media item having the media item ID 1389 ten (10) times.

FIG. 8 illustrates an exemplary embodiment of the recommendation table 38. As shown, each entry in the recommendation table 38 includes a recommendation ID, a media item ID, and a user ID of an originating user, or recommender, for the recommendation. Notably, when a user recommends a media item that was not previously recommended to that user, the user is identified as an originating user. A recommendation ID is assigned to the recommendation, and a new entry is added to the recommendation table 38. If a user recommends a media item that was previously recommended to that user, a new entry is not created in the recommendation table 38.

FIG. 9 illustrates an exemplary embodiment of the recommendation path table 40. As shown, each entry in the recommendation path table 40 includes a recommendation ID, a user ID of the recommender, and a user ID of the recipient. When a user makes a recommendation, the recommendation is assigned a new recommendation ID if the recommended media item was not previously recommended to the user. If the recommended media item was previously recommended to the user, the recommendation ID for the recommended media item is identified. An entry for each desired recipient of the recommendation is then created in the recommendation path table 40. If there is only one recipient, then only one entry is created in the recommendation path table 40. If there are multiple recipients, then a new entry is created in the recommendation path table 40 for each recipient. In this example, the recommendation having the recommendation ID 732 was provided from the user having the user ID 0001 to three recipients. As such, three entries were created in the recommendation path table 40.

FIG. 10 illustrates an exemplary embodiment of the highly valued recommendation table 42. As shown, each entry in the highly valued recommendation table 42 includes a user ID and a recommendation ID of a highly valued recommendation for that user. In this embodiment, if a user has more than one highly valued recommendation, the highly valued recommendation table 42 has multiple entries for that user.

Figure 11:
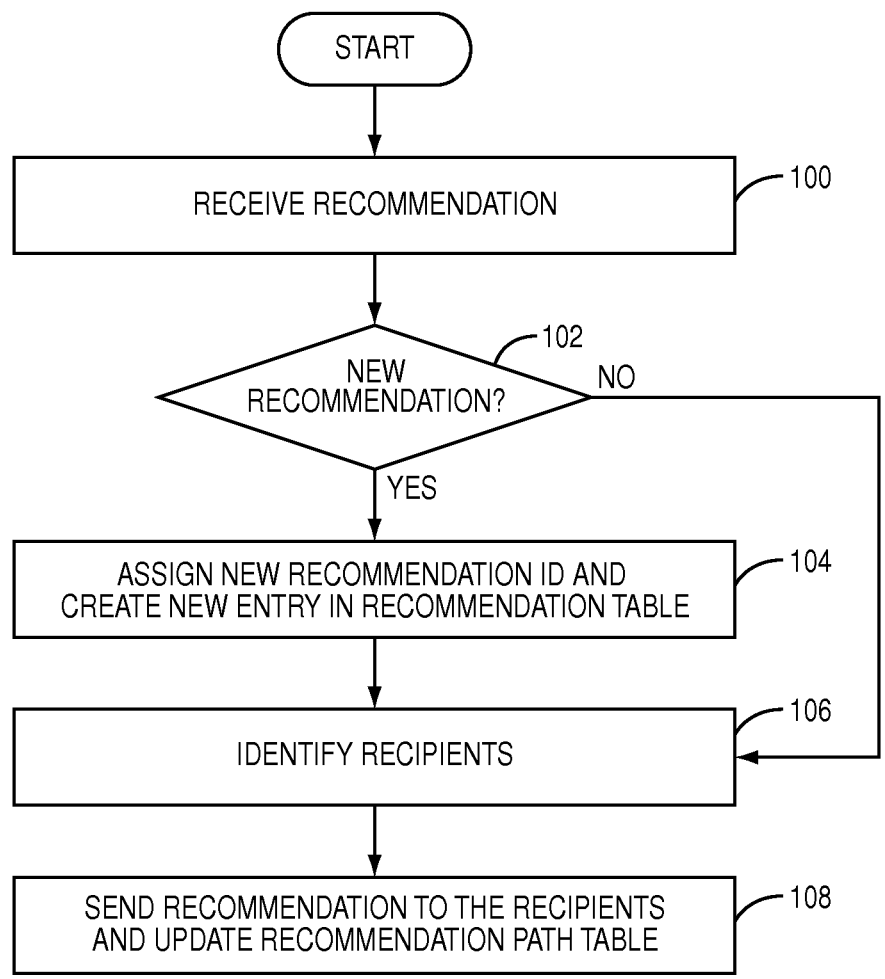
FIG. 11 is a flow chart illustrating the operation of the recommendation forwarding function of FIG. 1 according to one embodiment of the present invention.

FIG. 11 is a flow chart illustrating the operation of the recommendation forwarding function 20 of FIG. 1 according to one embodiment of the present invention. First, the recommendation forwarding function 20 receives a recommendation from one of the user devices 14-1 through 14-N (step 100). For this discussion, assume that the recommendation is received from the user device 14-1. Note that the recommendation may be a play notification where each media item played by the user device 14-1 is recommended to the friends of the user 18-1. Alternatively, the recommendation may be a recommendation manually entered by the user 18-1 by, for example, selecting a media item and initiating a recommendation to one or more desired recipients, which may be referred to as a user recommendation. Whether the recommendation is a play notification recommendation or a user recommendation, the recommendation includes the media ID of the recommended media item and the user ID of the user 18-1. In addition, the recommendation may include the user ID of one or more of the other users 18-2 through 18-N to receive the recommendation.

The recommendation forwarding function 20 then determines whether the recommendation is a new recommendation (step 102). In other words, the recommendation forwarding function 20 determines whether the recommended media item was previously recommended to the user 18-1. More specifically, in one embodiment, the recommendation forwarding function 20 performs a double query on the recommendation table 38 and the recommendation path table 40 to determine whether the recommended media item was previously recommended to the user 18-1. For example, the recommendation forwarding function 20 may first query the recommendation table 38 to identify the recommendation IDs of all recommendations for the recommended media item. Note that different recommendations for the recommended media item may have originated from different originating users. Using the identified recommendation IDs and the user ID of the user 18-1, the recommendation forwarding function 20 then queries the recommendation path table 40 to determine whether there is an entry for any one of the identified recommendation IDs where the user 18-1 is identified as the recipient. If so, the media item was previously recommended to the user 18-1 by another user and, as such, the recommendation received from the user 18-1 is not a new recommendation. If there is no entry for any of the identified recommendation IDs identifying the user 18-1 as the recipient, then the recommendation received from the user 18-1 is a new recommendation.

Using FIGS. 8 and 9 as an example, assume that the user ID of the user 18-1 is 0002 and the recommended media item has the media item ID 1389. The recommendation forwarding function 20 may first query the recommendation table 38 using the media item ID 1389 and determine that there are two recommendations for that media item having recommendation IDs 732 and 735. The recommendation forwarding function 20 may then query the recommendation path table 40 using the two recommendation IDs and the user ID of the user 18-1 to determine whether the user 18-1 has previously received either of those recommendations. In this example, the user 18-1, which for this example has the user ID of 0002, previously received the recommendation having the recommendation ID 732 from the user having the user ID 0001. As such, in this particular example, the recommendation received from the user device 14-1 of the user 18-1 is not a new recommendation.

If the recommendation is not a new recommendation, the process proceeds to step 106. If the recommendation is a new recommendation, the recommendation forwarding function 20 assigns a new recommendation ID to the recommendation and creates a new entry in the recommendation table 38 (step 104). The new entry in the recommendation table 38 includes the recommendation ID assigned to the recommendation, the media item ID of the recommended media item, and the user ID of the user 18-1 as the originating user.

Next, whether or not the recommendation is a new recommendation, the recipients for the recommendation are identified (step 106). In one embodiment, the recommendation forwarding function 20 queries the database 26 to obtain the friends list of the user 18-1. The friends of the user 18-1 are identified as the recipients of the recommendation. In another embodiment, the recommendation received from the user device 14-1 may include the user IDs of the desired recipients. Alternatively, the user device 14-1 may provide a list including the user IDs of the desired recipients separately from the recommendation.

Once the recipients are identified, the recommendation forwarding function 20 sends the recommendation to each of the recipients and updates the recommendation path table 40 (step 108). The recommendation path table 40 is updated by creating a new entry for each of the recipients. Each of these entries includes the recommendation ID of the recommendation, the user ID of the user 18-1 as the recommender, and the user ID of the corresponding recipient. Note that if the recommendation is a new recommendation, the recommendation ID for all of the new entries in the recommendation path table 40 is the recommendation ID assigned to the recommendation. Otherwise, the recommendation ID is the same as that for the recommendation for the media item previously received by the user 18-1, which was identified in step 102.

FIGS. 12A, 12B, and 13 illustrate the operation of the highly valued recommendation identification function 22 according to one embodiment of the present invention. FIG. 12A is a flow chart illustrating the receipt and processing of a play notification according to one embodiment of the present invention. First, the play notification is received from one of the user devices 14-1 through 14-N (step 200A). For this example, assume that the play notification is received from the user device 14-1. Next, the highly valued recommendation identification function 22 retrieves or otherwise obtains the record for the media item identified by the play notification from the play count table 34 using the user ID of the user 18-1 and the media item ID of the media item (step 202A).

Alternatively, the highly valued recommendation identification function 22 may query the play count table 34 using the user ID of the user 18-1 and the media item ID from the play notification to obtain the corresponding play count value.

A determination is then made as to whether the play count value is greater than a play count threshold value (step 204A). If not, the play count value is incremented by one (1) (step 206A). The play count value is updated in the play count table 34. The highly valued recommendation identification function 22 then determines whether the updated play count value is greater than the play count threshold (step 208A). If so, the process proceeds to FIG. 13 in order to add any recommendation previously received by the user 18-1 for the media item as a highly valued recommendation for the user 18-1. If the updated play count value is not greater than the play count threshold, the process ends.

Returning to step 204A, if the play count value is already greater than the play count threshold, the play count value is incremented by one (1) (step 210A). The play count value is updated in the play count table 34 and the process ends. Note that since the play count value is already greater than the play count threshold, any recommendation for the media item previously received by the user 18-1 has already been identified as a highly valued recommendation.

FIG. 12B illustrates a process similar to that of FIG. 12A performed for received recommendations. Note if play notifications are also used as recommendations or more specifically used to trigger recommendations to the friends of the corresponding user, both the processes of FIG. 12A and FIG. 12B are preferably performed. However, the present invention is not limited thereto. Note that whether or not play notifications are used to trigger recommendations to the friends of the corresponding user may be a user option. Thus, if a user has selected the option to have recommendations sent to his or her friend in response to playback of media items, the playback count value and the recommendation count value may be the same. However, if the user does not select this option or if the user thereafter disables this option, the playback count value and the recommendation count value may be different.

Turning to the flow chart of FIG. 12B, the highly valued recommendation identification function 22 first receives a recommendation from one of the user devices 14-1 through 14-N (step 200B). For this example, assume that the recommendation is received from the user device 14-1. Again, note that the recommendation may be a play notification recommendation where a play notification operates as a recommendation to be provided to the friends of the user 18-1 or a user recommendation initiated by the user 18-1. Next, the highly valued recommendation identification function 22 retrieves or otherwise obtains the record for the media item identified by the recommendation from the recommendation count table 36 using the user ID of the user 18-1 and the media item ID of the media item (step 202B). Alternatively, the highly valued recommendation identification function 22 may query the recommendation count table 36 using the user ID of the user 18-1 and the media item ID from the recommendation to obtain the corresponding recommendation count value.

A determination is then made as to whether the recommendation count value is greater than a recommendation count threshold value (step 204B). If not, the recommendation count value is incremented by one (1) (step 206B). Alternatively, the recommendation count value may be incremented by the number of recipients to receive the recommendation from the user 18-1. The recommendation count value is updated in the recommendation count table 36. The highly valued recommendation identification function 22 then determines whether the updated recommendation count value is greater than the recommendation count threshold (step 208B). If so, the process proceeds to FIG. 13 in order to add any recommendation previously received by the user 18-1 for the media item as a highly valued recommendation for the user 18-1. If the updated recommendation count value is not greater than the recommendation count threshold, the process ends.

Returning to step 204B, if the recommendation count value is already greater than the recommendation count threshold, the recommendation count value is incremented by one (1) (step 210B). Alternatively, the recommendation count value may be incremented by the number of recipients to receive the recommendation from the user 18-1. The recommendation count value is updated in the recommendation count table 36 and the process ends. Note that since the recommendation count threshold is already greater than the recommendation count value, any recommendation for the media item previously received by the user 18-1 has already been identified as a highly valued recommendation.

Turning to FIG. 13, if the updated play count value is greater than the play count threshold (step 208A, FIG. 12A) or if the updated recommendation count value is greater than the recommendation count threshold (step 208B, FIG. 12B), the highly valued recommendation identification function 22 then creates a list of all recommendations of the media item made to the user 18-1 (step 212). More specifically, in one embodiment, the highly valued recommendation identification function 22 performs a double query on the recommendation table 38 and the recommendation path table 40 to identify any recommendations of the media item to the user 18-1. Note that the number of recommendations of the media item to the user 18-1 may be zero if the media item has never been recommended to the user 18-1. For example, the highly valued recommendation identification function 22 may first query the recommendation table 38 with the media item ID of the media item to identify the recommendation ID of each of a number of recommendations for the media item. The highly valued recommendation identification function 22 may then query the recommendation path table 40 with the identified recommendation IDs and the user ID of the user 18-1 as the recipient to identify the recommendation IDs of each recommendation of the media item to the user 18-1.

The first recommendation in the list of recommendations of the media item to the user 18-1 is then identified (step 214). A determination is then made as to whether there is an entry in the highly valued recommendation table 42 for that recommendation using the corresponding recommendation ID (step 216). If so, the process proceeds to step 220. If not, the highly valued recommendation identification function creates an entry for the recommendation for the user 18-1 (step 218). For the embodiment of the highly valued recommendation table 42 shown in FIG. 10, the new entry includes the user ID of the user 18-1 and the recommendation ID. The highly valued recommendation identification function 22 then determines whether there are any more recommendations in the list of recommendations of the media item made to the user 18-1 (step 220). If so, the highly valued recommendation identification function 22 moves to the next recommendation in the list of recommendations of the media item to the user 18-1 (step 222) and returns to step 216. Otherwise, the process ends.

FIGS. 14A and 14B provide a flow chart illustrating the operation of the new friend discovery function 24 of FIG. 1 according to one embodiment of the present invention. First, the new friend discovery function 24 receives a request for a list of potential new friends from one of the user devices 14-1 through 14-N (step 300). For this example, assume that the request is received from the user device 14-1 associated with the user 18-1. In one embodiment, the request includes the user ID of the user 18-1. The new friend discovery function 24 then obtains a list of highly valued recommendations for the user 18-1 from the highly valued recommendation table 42 (step 302).

Moving to FIG. 14B, the new friend discovery function 24 starts at, or identifies, the first highly valued recommendation in the list obtained in step 302 (step 304). The new friend discovery function 24 then obtains a list of all users in the recommendation path for the recommendation from the originating recommender to the user 18-1 (step 306). More specifically, in one embodiment, the new friend discovery function 24 may query the recommendation table 38 with the recommendation ID of the highly valued recommendation to obtain the user ID of the originating user. The new friend discovery function 24 may then query the recommendation path table 40 with the recommendation ID and the user ID of the originating user to identify the recipient of the recommendation from the originating recommender. The new friend discovery function 24 may then query the recommendation path table 40 with the recommendation ID and the user ID of the recipient of the recommendation from the originating recommender to identify the next user in the recommendation path. The process continues until all of the users in the recommendation path from the originating user to the user 18-1 are identified.

The new friend discovery function 24 then starts at, or identifies, the first recommender, or user, in the list of users in the recommendation path (step 308). A determination is made as to whether the recommender is already in the friends list of the user 18-1 (step 310). If so, the process proceeds to step 314. Otherwise, the new friend discovery function 24 identifies the recommender as a potential new friend for the user 18-1 (step 312). The new friend discovery function 24 then determines whether there are any more recommenders in the recommendation path to be processed (step 314). If so, the new friend discovery function 24 goes to the next recommender in the list of users in the recommendation path (step 316) and returns to step 310.

Returning to step 314, once there are no more recommenders in the list of users in the recommendation path, the new friend discovery function 24 determines whether there are more highly valued recommendations for the user 18-1 (step 318). If so, the new friend discovery function 24 moves to the next highly valued recommendation for the user 18-1 (step 320) and returns to step 306. Returning to step 318, once there are no more highly valued recommendations for the user 18-1, the new friend discovery function 24 returns a list of potential new friends to the user device 14-1 of the user 18-1 (step 322), and then the process ends.

At this point, the user 18-1 may select one or more of the potential new friends to add to his or her friends list. Note that the new friend discovery function 24 may provide additional information describing the potential new friends to the user 18-1 at the user device 14-1 automatically or upon request. In an alternative embodiment, either the central server 12 or the user device 14-1 may operate to automatically select or recommend new friends from the list of potential new friends using a technique such as, but not limited to, user profile matching. A user profile may include, for example, biographical information describing the corresponding user, demographic information describing the corresponding user, preferences of the corresponding user such as music preferences, a play history of the corresponding user, or the like. In yet another embodiment, all of the potential new friends may be added as new friends of the user 18-1.

FIG. 15 is a block diagram of the central server 12 of FIG. 1 according to one embodiment of the present invention. In general, the central server 12 includes a control system 50 having associated memory 52. In this embodiment, the recommendation forwarding function 20, the highly valued recommendation identification function 22, and the new friend discovery function 24 are implemented in software and stored in the memory 52. However, the present invention is not limited thereto. The central server 12 may also include one or more digital storage devices 54 such as, for example, one or more hard disk drives or the like. The database 26 may be implemented in the one or more digital storage devices 54. As discussed above, the database 26, or any portion thereof, may alternatively be implemented as a remote database accessible to the central server 12 via a remote connection such as, for example, the network 16. The central server 12 also includes a communication interface 56 communicatively coupling the central server 12 to the network 16 (FIG. 1). Lastly, the central server 12 includes a user interface 58, which may include components such as, for example, a display, one or more user input devices, or the like.

FIG. 16 is a block diagram of the user device 14-1 of FIG. 1 according to one embodiment of the present invention. This discussion is equally applicable to the other user devices 14-2 through 14-N. In general, the user device 14-1 includes a control system 60 having associated memory 62. In this embodiment, the playback notification and recommendation function 44-1 and the media playback function 46-1 are implemented in software and stored in the memory 62. However, the present invention is not limited thereto. The user device 14-1 may also include one or more digital storage devices 64 such as, for example, one or more hard disk drives, one or more memory cards, or the like. In one embodiment, the media collection 48-1 (FIG. 1) may be stored in the digital storage device 64. Alternatively, the media collection 48-1 may be stored in the memory 62. The user device 14-1 also includes a communication interface 66 communicatively coupling the user device 14-1 to the network 16 (FIG. 1). Lastly, the user device 14-1 includes a user interface 68, which may include components such as, for example, a display, one or more user input devices, or the like.

The present invention provides substantial opportunity for variation without departing from the spirit or scope of the present invention. For example, rather than utilizing a central server 12 to forward recommendations among the user devices 14-1 through 14-N, the recommendations may be exchanged between the user devices 14-1 through 14-N directly in a direct peer-to-peer (P2P) fashion. As another example, the functionality of the highly valued recommendation identification function 22 and/or the functionality of the new friend discovery function 24 may alternatively be implemented on one of the user devices 14-1 through 14-N or distributed among two or more of the user devices 14-1 through 14-N. For example, each of the user devices 14-1 through 14-N may have its own highly valued recommendation identification function 22 and/or new friend discovery function 24.

Those skilled in the art will recognize improvements and modifications to the preferred embodiments of the present invention. All such improvements and modifications are considered within the scope of the concepts disclosed herein and the claims that follow.

What is claimed is:

1. A method for operating a server comprising:
receiving a notification of playback of a media item from a device wherein the playback of the media item is based on a media item recommendation received by the device;
determining whether the playback count of the media item is greater than a threshold;
designating the media item recommendation as a highly valued recommendation if the playback count of the media item is greater than the threshold; and
discovering a second user account in the social network using a recommendation path for a highly valued recommendation by:
identifying the recommendation path for the highly valued recommendation of the media item recommendation, where in the recommendation path comprises an originating user account in the social network and at least one intermediate user account in the social network through which the recommendation was propagated to the first user account;
determining that one of the originating user account and the at least one intermediate user account is not already linked to the first user account; and
identifying the one of the originating user account and the at least one intermediate user account that is not already linked to the first user account as the second user account.

2. A system comprising components including:
a server comprising:
a server network communication interface for communicating over a network with a plurality of devices;
at least one server processor; and
server software containing software executable by the at least one server processor whereby the server is operative to
receive a notification of the playback of a media item from a device of the plurality of devices, wherein the playback of the media item is based on a media item recommendation received by the device of the plurality of the devices for a first user account;
determine whether a playback count of the media item is greater than a threshold;
designate the media item recommendation as a highly valued recommendation if the playback count of the media item is greater than the threshold; and
discover a second user account in the social network using a recommendation path for a highly valued recommendation by:
identifying the recommendation path for the highly valued recommendation of the media item recommendation, where in the recommendation path comprises an originating user account in the social network and at least one intermediate user account in the social network through which the recommendation was propagated to the first user account;
determining that one of the originating user account and the at least one intermediate user account is not already linked to the first user account; and
identifying the one of the originating user account and the at least one intermediate user account that is not already linked to the first user account as the second user account;
and
the device of the plurality of devices comprising:
a device network communication interface for communicating over the network with the server;
at least one processor; and
memory containing software executable by the at least one processor whereby the device is operative to:
receive the media item recommendation for the media item;
playback the media item; and
send a notification of the playback of the media item to the server.

3. The system of claim 2, wherein the first user account is associated with a social network comprising the first user account and a third user account and wherein the first user account and the third user account are linked by at least one relationship.

4. The system of claim 3, wherein the at least one relationship is a friend relationship.

5. The system of claim 3, wherein the social network is a media recommendation network wherein the first user account sends media item recommendations to the third user account and the third user account sends media item recommendations to the first user account.

6. The system of claim 2 wherein to discover the second user account, the server is further operative to:
provide information identifying the third user account to the first user account at the device; and
enable the linking of the first and third user accounts by at least one relationship.

7. The system of claim 2 wherein to identify the originating user account and the at least one intermediate user account that is not already linked to the first user account as the potential second user account, the server is operable to compare the user profile of the first user to the user profile of at least the originating user account and intermediate user accounts.

8. The system of claim 2 wherein the server is further operative to increment the playback count in response to receiving the notification.

9. A method of operating a server comprising:
receiving, from a device, a notification of the receipt of a media item recommendation for a media item by the device;
determining whether the recommendation count of the media item is greater than a threshold;
designating the media item recommendation as a highly valued recommendation if the recommendation count of the media item is greater than the threshold; and
discovering a second user account in the social network using a recommendation path for a highly valued recommendation by:
identifying the recommendation path for the highly valued recommendation of the media item recommendation, where in the recommendation path comprises an originating user account in the social network and at least one intermediate user account in the social network through which the recommendation was propagated to the first user account;
determining that one of the originating user account and the at least one intermediate user account is not already linked to the first user account; and
identifying the one of the originating user account and the at least one intermediate user account that is not already linked to the first user account as the second user account.

10. A system comprising components including:

a server comprising:
- a server network communication interface;
- at least one server processor in communication with the network communication interface; and
- server memory containing software executable by the at least one server processor whereby the server is operative to:
  - receive, from a device, a notification of the receipt of a media item recommendation for a media item by the device for a first user account;
  - determine whether the recommendation count of the media item is greater than a threshold;
  - designate the media item recommendation as a highly valued recommendation if the recommendation count of the media item is greater than the threshold;
  - discover a second user account in the social network using a recommendation path for a highly valued recommendation by:
    - identifying the recommendation path for the highly valued recommendation of the media item recommendation, where in the recommendation path comprises an originating user account in the social network and at least one intermediate user account in the social network through which the recommendation was propagated to the first user account;
    - determining that one of the originating user account and the at least one intermediate user account is not already linked to the first user account; and
    - identifying the one of the originating user account and the at least one intermediate user account that is not already linked to the first user account as the second user account;

and the device comprising:
- a network communication interface adapted to establish communication with the hardware server;
- at least one processor; and
- memory containing software executable by the at least one processor whereby the device is operative to:
  - receive the media item recommendation for the media item; and
  - send the notification of the receipt of the media item recommendation to the server.

11. The system of claim 10, wherein the first user account is associated with a social network comprising the first user account and a third user account and wherein the first user account and the third user account are linked by at least one relationship.

12. The system of claim 11, wherein the at least one relationship is a friend relationship.

13. The system of claim 11, wherein the social network is a media recommendation network wherein the first user account sends media item recommendations to the third user account and the third user account sends media item recommendations to the first user account.

14. The system of claim 10 wherein to discover the second user account, the server is further operable to:
- provide information identifying the third user account to the first user account at the device; and
- enable the linking of the first and third user accounts by at least one relationship.

15. The system of claim 10 wherein to identify the originating user account and the at least one intermediate user account that is not already linked to the first user account as the potential second user account, the server is operable to compare the user profile of the first user to the user profile of at least the originating user account and the at least one intermediate user account.

16. The system of claim 10 wherein the server is further operative to increment the recommendation count in response to receiving the notification.

* * * * *